(12) United States Patent  
Doczy et al.

(10) Patent No.: US 9,092,189 B2  
(45) Date of Patent: Jul. 28, 2015

(54) PRIVACY SCREEN MOUNTING SYSTEM

(75) Inventors: Paul J. Doczy, Houston, TX (US); Earl W. Moore, Houston, TX (US); Sarah Jane Bussell, Houston, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2339 days.

(21) Appl. No.: 11/411,539

(22) Filed: Apr. 26, 2006

(65) Prior Publication Data

US 2007/0253065 A1  Nov. 1, 2007

(51) Int. Cl.  
*G06F 1/16* (2006.01)

(52) U.S. Cl.  
CPC .......... *G06F 1/1609* (2013.01); *G06F 1/1616* (2013.01); *G06F 1/1637* (2013.01)

(58) Field of Classification Search  
CPC .... G06F 1/1609; G06F 1/1616; G06F 1/1637  
USPC .................................................. 359/601–614  
See application file for complete search history.

(56) References Cited

U.S. PATENT DOCUMENTS

| | | | |
|---|---|---|---|
| 4,253,737 A | | 3/1981 | Thomsen et al. |
| 4,444,465 A | | 4/1984 | Giulie et al. |
| 4,633,322 A | | 12/1986 | Fourny |
| 4,819,085 A | | 4/1989 | Liang |
| 5,030,882 A | | 7/1991 | Solero |
| 5,227,916 A | * | 7/1993 | Theirl et al. ................. 359/609 |
| 5,526,180 A | * | 6/1996 | Rausnitz ...................... 359/609 |
| RE35,691 E | | 12/1997 | Theirl et al. |
| 5,717,566 A | | 2/1998 | Tao |
| 5,909,315 A | * | 6/1999 | Keehn ........................ 359/609 |
| 6,046,754 A | * | 4/2000 | Stanek ........................ 345/169 |
| 6,125,525 A | | 10/2000 | Brock |
| 6,378,232 B1 | * | 4/2002 | Creech ...................... 40/606.15 |
| 6,512,607 B1 | | 1/2003 | Windsor et al. |
| 6,731,416 B2 | | 5/2004 | Hazzard |
| 6,765,550 B2 | | 7/2004 | Janick et al. |
| 7,280,348 B2 | * | 10/2007 | Ghosh ...................... 361/679.27 |
| 2005/0057896 A1 | * | 3/2005 | Homer ........................ 361/686 |
| 2005/0094362 A1 | * | 5/2005 | Stephens ..................... 361/681 |

* cited by examiner

*Primary Examiner* — Waseem Moorad  
(74) *Attorney, Agent, or Firm* — Michael W. Dubner

(57) ABSTRACT

A privacy screen mounting system, comprising a bezel having a recess for receiving a movable retention member therein, the retention member positionable from a retracted position to an extended position relative to a display screen to secure a privacy screen over the display screen.

17 Claims, 3 Drawing Sheets

PRIVACY SCREEN MOUNTING SYSTEM

BACKGROUND OF THE INVENTION

Because of the increased portability of computer devices, users are able to transport and use the computer devices in public areas where privacy is minimal. Privacy screens have been developed to overlay display screens on the computer devices in order to reduce the viewing angles of the display screen; however, the privacy screens are difficult to securely fasten to the computer device, can be difficult to remove when not necessary, and require additional installation components (e.g., tape, hooks, screws, etc.), which can become easily separated or misplaced from the computer device.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-3b of the drawings, like numerals being used for like and corresponding parts of the various drawings.

Figure 1:
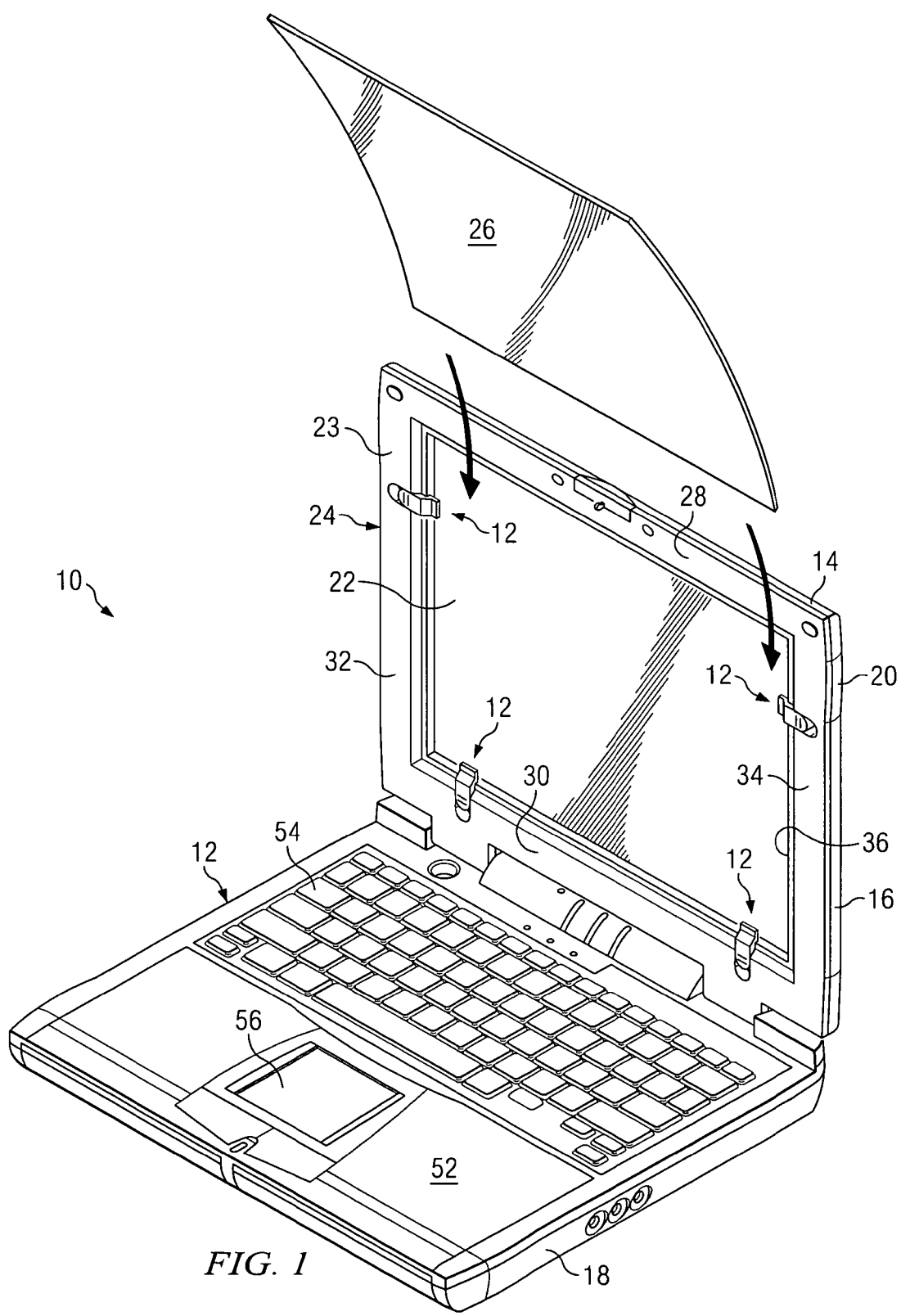
FIG. 1 is a diagram illustrating an embodiment of a privacy screen mounting system in accordance with the present invention.

FIG. 1 is a diagram illustrating an embodiment of a privacy screen mounting system 10 in accordance with the present invention. In FIG. 1, system 10 is illustrated in connection with a laptop or notebook computer 14. However, it should be understood that system 10 may be used with other types of devices such as, but not limited to, desktop computers, stand-alone display devices, tablet computers, personal digital assistants, portable telephones, or any other type of electronic device having a display element or screen. In the embodiment illustrated in FIG. 1, system 10 comprises retention members 12 for securing a privacy screen 26 to computer 14. In the illustrated embodiment, computer 14 comprises a display member 16 rotatably coupled to a base member 18. Display member 16 comprises a housing 20 for supporting a display screen 22. Housing 20 comprises a frame or bezel 24 surrounding and/or otherwise disposed about a periphery of display screen 22. Retention members 12 are disposed in and/or otherwise coupled to bezel 24 and operate to secure privacy screen 26 adjacent to and/or in front of display screen 22. In operation, privacy screen 26 is preferably configured to reduce and/or otherwise limit the viewing angle of display screen 22 (e.g., to reduce the angle relative to display screen 22 at which a person may viewer content displayed on display screen 22 and/or reduce glare relative to display screen 22). Privacy screen 26 may also be configured, in addition to or alternatively to privacy features, to increase the visibility of content displayed on display screen (e.g., magnification of displayed content). In the embodiment illustrated in FIG. 1, four retention members 12 are illustrated; however, it should be understood that a greater or fewer number of retention members 12 may be used.

In the embodiment illustrated in FIG. 1, retention members 12 are permanently secured to computer 14 (as used herein, "permanently secured" shall mean that retention members 12 are configured as part of computer 14 (e.g., part of bezel 24) and/or are otherwise not readily removable from computer 14 (e.g., not readily removable from bezel 24)). Preferably, retention members 12 are disposed flush (flush meaning flush or substantially flush) with a forwardly-facing surface 23 of bezel 24. Preferably, retention members 12 are disposed flush with bezel 24 to facilitate closing of display member 16 relative to base member 18 without damaging display screen 22, privacy screen 26, retention members 12 and/or components on a working surface 52 of base member 18 (e.g., a keyboard 54, a touch pad 56 and/or any other component(s) on working surface 52).

In the embodiment illustrated in FIG. 1, bezel 24 comprises a top portion 28, a bottom portion 30, and a pair of side portions 32 and 34 that form an opening 36 surrounding display screen 22. In the embodiment illustrated in FIG. 1, retention members 12 are disposed on portions 30, 32 and 34 of bezel 24; however, it should be understood that retention members 12 may be otherwise located (e.g., a greater or fewer number of retention members 12 on each of portions 30, 32, 34 and/or on top portion 28 as well as on fewer sides of bezel 24). In the illustrated embodiment, retention members 12 are configured to be variably positionable to facilitate extension of retention members 12 at least partially over display screen 22 to secure privacy screen 26 adjacent to and/or in front of display screen 22 (e.g., to position and/or retain privacy screen 26 relative to display screen 22). Retention members 12 are preferably configured to retract to a position adjacent display screen 22 (e.g., unobstructing a viewing portion of display screen 22). For example, when the use of privacy screen 26 is not desired, retention members 12 are adjustable to at least partially retract relative to display screen 22 to minimize and/or eliminate obstructing the viewing area of display screen 22.

Figure 2A:
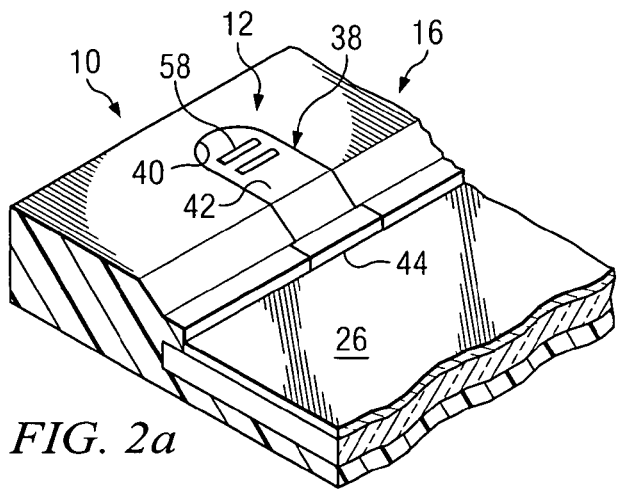
FIGS. 2a and 2b are diagrams illustrating an embodiment of a retention member of the privacy screen mounting system of FIG. 1 in retracted and extended positions, respectively, in accordance with the present invention.
Figure 2B:
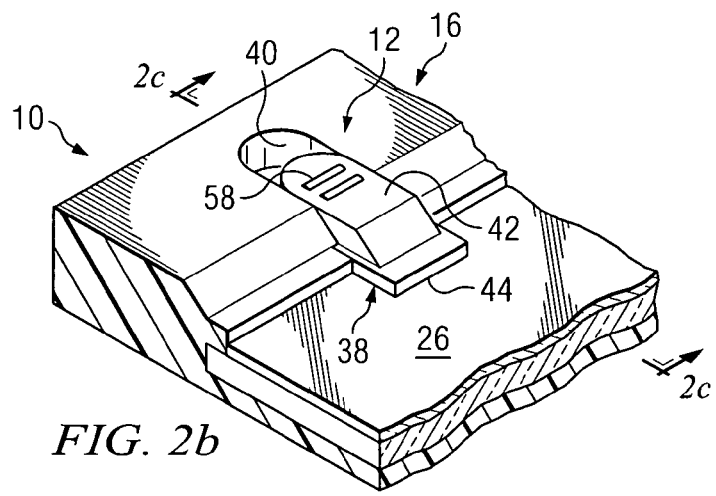

FIGS. 2a and 2b are diagrams illustrating an embodiment of retention member 12 in a retracted and an extended position, respectively, relative to display screen 22 in accordance with the present invention. In the embodiment illustrated in FIGS. 2a and 2b, retention member 12 comprises a tab member 38 to facilitate movement of retention member 12 relative to a recessed area 40 formed in bezel 24. Tab member 38 comprises a top portion 42 that is preferably configured to be flush with surface 23 and a bottom portion 44 that is configured to extend over display screen 22 when retention member 12 is in an extended position (FIG. 2b) to facilitate securing privacy screen 26 over display screen 22. Preferably, bottom portion 44 is configured to be spaced apart from display screen 22 a predetermined distance to provide a gap between portion 44 and display screen 22 to facilitate receiving a portion of privacy screen 26 therebetween. In the embodiment illustrated in FIGS. 2a and 2b, top portion 42 comprises a gripping element 58 to enable a user to position retention members 12 between the extended and retracted positions. At least a portion of bottom portion 44 (e.g., edges 44a and 44b) extend into a portion of bezel 24 to secure retention members 12 within recessed areas 40. However, it should be understood that other methods or devices may be used to secure retention members 12 to bezel 24.

Figure 2C:
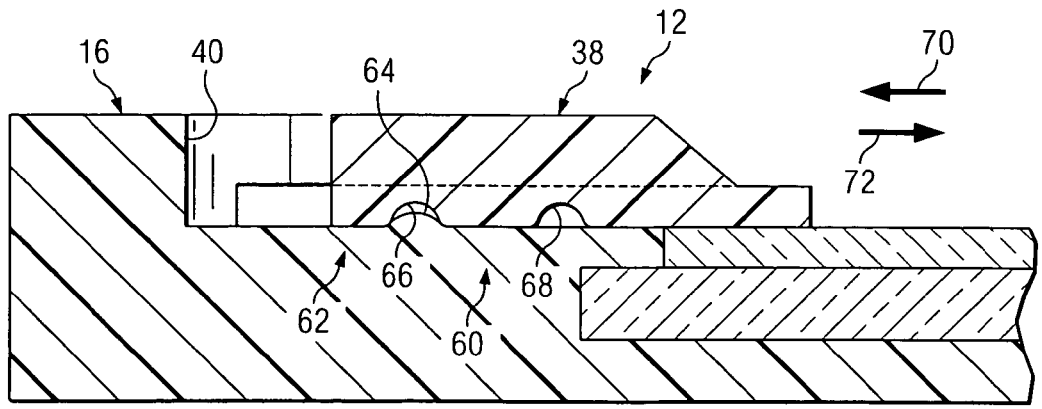
FIG. 2c is a diagram illustrating a section view of the retention member in the position illustrated in FIG. 2b in accordance with the present invention.

FIG. 2c is a diagram illustrating a section view of retention member 12 illustrated in FIG. 2b taken along the line 2c-2c of FIG. 2b in accordance with the present invention. In the embodiment illustrated in FIG. 2c, system 10 comprises a locking mechanism 60 configured to restrict relative movement of retention member 12 relative to display screen 12 and/or bezel 24. In the illustrated embodiment, locking mechanism 60 comprises a protrusion 64 disposed on a portion of bezel 24 within recessed area 40 and a pair of detents 66 and 68 formed on retention member 12. It should be understood that the location of protrusion 64 and detents 66 and 68 may be reversed (e.g., detents formed in bezel 24 and a protrusion formed on retention member 12). It should also be understood that any other type of locking mechanism 60 may be used to restrict relative movement between retention member 12 and display screen 22 and/or bezel 24.

In operation, retention members 12 are slidably positionable relative to display screen 22 and/or bezel 24. For example, in response to sliding movement of retention member 12 in the direction indicated by 72 from a retracted position (FIG. 2a) to an extended position (FIGS. 2b and 2c), protrusion 64 engages detent 66 to secure retention member 12 in the extended position. In response to sliding movement of retention member 12 in the direction 70 from the extended position (FIGS. 2b and 2c) to the retracted position (FIG. 2a), protrusion 64 engages detent 68 to secure retention member 12 in the retracted position.

Figure 3A:
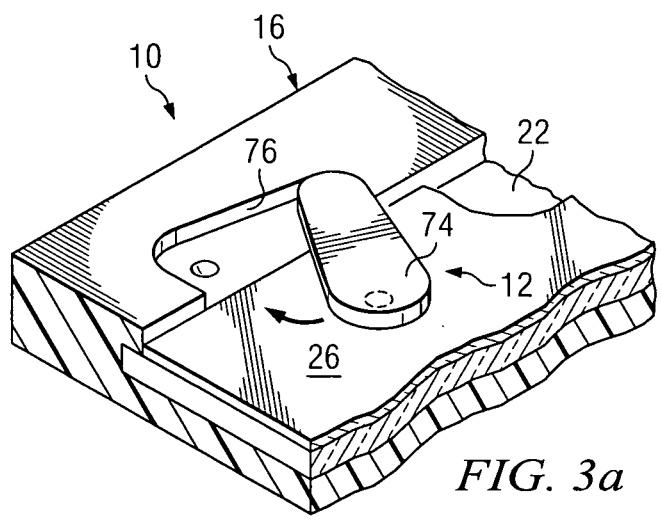
FIGS. 3a and 3b are diagrams illustrating another embodiment of a privacy screen mounting system in accordance with the present invention in retracted and extended positions., respectively.
Figure 3B:
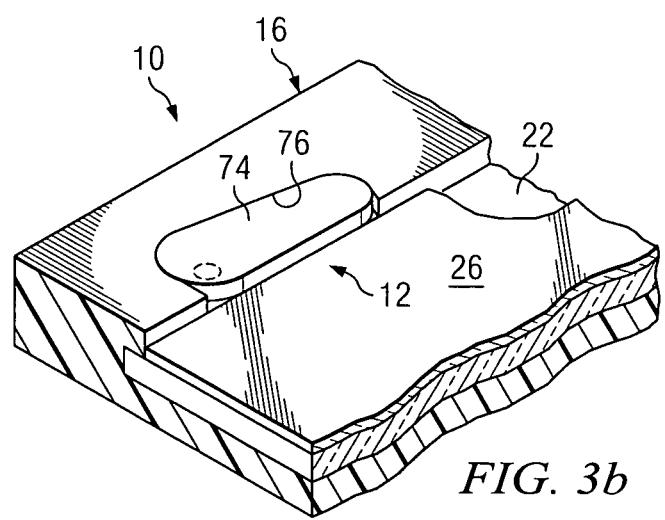

FIGS. 3a and 3b are diagrams illustrating another embodiment of privacy screen mounting system 10 in accordance with the present invention. In the embodiment illustrated in FIGS. 3a and 3b, retention member 12 comprises a pivotable tab member 74 secured to bezel 24. Tab member 74 is pivotable between an extended position (FIG. 3a) where tab member 74 extends generally outward from a recessed area 76 formed in bezel 24 to a position over at least a portion of display screen 22, and a retracted position (FIG. 3b) where tab member 74 is disposed within recessed area 76 so that the viewing area of display screen 22 remains fully or substantially unobstructed (e.g., where none or a minimal portion of tab member 74 extends over display screen 22). Preferably, tab member 74 is configured to be spaced apart a predetermined distance from display screen 22 when tab member 74 is in the extended position to provide a gap for receiving at least a portion of privacy screen 26 therebetween.

Thus, in operation, to install and/or otherwise secure privacy screen 26 over display screen 22, retention members 12 are extended from a retracted position to an extended position (FIG. 1), and edge portions of privacy screen 26 are slidably insertable between retention members 12 and display screen 22, thereby positioning and retaining privacy screen 26 over display screen 22. Alternatively, privacy screen 26 is disposable over display screen 22 and retention members 12 then extended from a retracted position (FIG. 2a) to an extended position (FIG. 1), thereby securing privacy screen 26 over display screen 22. It should be understood that privacy screen 26 may be removed from computer 14 by slidingly removing edge portions of privacy screen 26 from between retention members 12 and display screen 22, and then sliding retention members 12 to a retracted position (FIG. 2a), or sliding retention members 12 to a retracted position (FIG. 2a) and removing privacy screen 26 from computer 14.

Thus, embodiments of the present invention enable a user to easily attach or remove privacy screen 26 relative to display screen 22. Further, embodiments of the present invention provide a more reliable method and system for releasably securing privacy screen 26 over display screen 22 by using retention members 12 that are configured as forming part of computer 14 (e.g., formed as an integral component of a display frame or bezel 24).

What is claimed is:

1. An electronic device, comprising:
  a display screen that includes a bezel with a recess located in the bezel; and
  a movable retention member disposed in the recess, the retention member positionable from a retracted position in the recess to an extended position out of the recess and partially over the display screen to secure a privacy screen over the display screen, wherein the privacy screen fits between the retention member and display screen and extends parallel to the display screen; and
  a locking mechanism configured to restrict movement of the retention member related to the display screen.

2. The electronic device of claim 1, wherein the retention member slides in the recess from the retracted position to the extended position.

3. The electronic device of claim 1, wherein the retention member pivots in the recess from the retracted position to the extended position.

4. The electronic device of claim 1, wherein the retention member is flush with a surface of the bezel in the retracted position and extends over the display screen in the extended position.

5. The electronic device of claim 1, wherein the retention member is flush with a forwardly-facing surface of the bezel to facilitate closing of a display of the electronic device relative to a base of the electronic device.

6. The electronic device of claim 1, wherein the retention member, when in the extended position, forms a gap between the retention member and the display screen for receiving a portion of the privacy screen.

7. The electronic device of claim 1, wherein the electronic device is a notebook computer, and the retention member is permanently secured to the bezel of a display member of the notebook computer.

8. A computer comprising:
  a display screen with a frame that surrounds the display screen; and
  a retention member secured in a recess that is located in the frame, the retention member moves from a retracted position in the recess to an extended position out of the recess and partially over the display screen to secure a removable privacy screen over the display screen, wherein the removable privacy screen fits over and covers the display screen; and
  a locking mechanism that includes a protrusion that fits within a detent to secure the retention member in the retracted position.

9. The computer of claim 8, wherein the privacy screen is parallel with and rests on the display screen.

10. The computer of claim 8, wherein the retention member is flush with an exterior surface of the frame in the retracted position to enable a display of the computer to close relative to a base of the computer.

11. The computer of claim 8, wherein a bottom surface of an end of the retention member forms a gap with a surface of the display screen when the retention member is in the extended position, the gap receives a portion of the privacy screen to secure the privacy screen to the frame of the computer.

12. A computer comprising:
  a display screen having a bezel that forms a frame of the display screen; and a retention member disposed in a recess of the bezel, the retention member movable relative to the bezel between a retracted position in the recess and an extended position extending out of the recess and partially over the display screen, wherein the retention member secures a privacy screen over the display screen in the extended position and disengages from the privacy screen in the retracted position, wherein the privacy screen rests on the display screen to cover the display screen; and a locking mechanism that includes a protrusion that fits in a detent to restrict movement of the retention member relative to the bezel.

13. The computer of claim 12, wherein the privacy screen and the display screen are parallel to each other from a cross-sectional view.

14. The computer of claim 12, wherein the privacy screen fits between the plural retention members and the display screen.

15. The computer of claim 12, wherein the retention member is configured to be flush with a forwardly-facing surface of the bezel.

16. The computer of claim 12, wherein the computer is a notebook computer, and the retention member is permanently secured to a frame of the notebook computer.

17. The computer of claim 12, wherein the retention member is configured to form a gap between the retention member and the display screen for receiving at least a portion of the privacy screen therebetween to secure the privacy screen over the display screen.

* * * * *